(12) United States Patent
Bushman

(10) Patent No.: US 11,549,610 B2
(45) Date of Patent: Jan. 10, 2023

(54) VALVE POSITION INDICATOR

(71) Applicant: CACTUS WELLHEAD, LLC, Houston, TX (US)

(72) Inventor: Jerod C. Bushman, Tomball, TX (US)

(73) Assignee: CACTUS WELLHEAD, LLC, Houston, TX (US)

( * ) Notice: Subject to any disclaimer, the term of this patent is extended or adjusted under 35 U.S.C. 154(b) by 46 days.

(21) Appl. No.: 17/353,936

(22) Filed: Jun. 22, 2021

(65) Prior Publication Data

US 2021/0310580 A1 Oct. 7, 2021

Related U.S. Application Data

(63) Continuation of application No. 16/663,685, filed on Oct. 25, 2019, now Pat. No. 11,073,227.

(60) Provisional application No. 62/805,745, filed on Feb. 14, 2019.

(51) Int. Cl.
*F16K 37/00* (2006.01)
*F16K 31/528* (2006.01)

(52) U.S. Cl.
CPC ........ *F16K 37/0008* (2013.01); *F16K 31/528* (2013.01); *F16K 31/5286* (2013.01); *F16K 37/0016* (2013.01); *Y10T 137/8275* (2015.04); *Y10T 137/8292* (2015.04); *Y10T 137/8309* (2015.04)

(58) Field of Classification Search
CPC ............. F16K 37/0008; F16K 37/0016; Y10T 137/8275; Y10T 137/8292
See application file for complete search history.

(56) References Cited

U.S. PATENT DOCUMENTS

| | | | | |
|---|---|---|---|---|
| 4,436,280 A | * | 3/1984 | Geisow | F16K 31/54 74/25 |
| 6,007,047 A | * | 12/1999 | Phipps | F16K 31/528 74/25 |
| 2010/0276016 A1 | * | 11/2010 | Noh | F16K 37/0041 137/554 |
| 2013/0015382 A1 | * | 1/2013 | Thorpe | F16K 31/5286 251/304 |
| 2013/0105718 A1 | * | 5/2013 | Fache | C25D 13/14 251/366 |
| 2013/0146793 A1 | * | 6/2013 | Gustafson | F16K 37/0008 137/551 |
| 2015/0226580 A1 | * | 8/2015 | Dequarti | G01D 5/26 324/207.25 |
| 2020/0378526 A1 | * | 12/2020 | Nelson | G01D 5/02 |

* cited by examiner

*Primary Examiner* — Atif H Chaudry
(74) *Attorney, Agent, or Firm* — Ewing & Jones, PLLC

(57) ABSTRACT

A valve position indicator for a valve includes a spline barrel, indicator flag, and follower. The spline barrel may be generally tubular and may be positionable about a tail stem protector of the valve. The spline barrel may have a helical slot formed therein. The spline barrel may be rotatably coupled to the tail stem protector of a valve. The indicator flag may be coupled to the spline barrel and may extend radially therefrom. The follower may be coupleable to a tail stem of the valve. The follower may extend in a direction perpendicular to the extent of the tail stem. The follower may extend through a slot in the tail stem protector and the helical slot of the spline barrel when the spline barrel is positioned about the tail stem protector.

10 Claims, 8 Drawing Sheets

VALVE POSITION INDICATOR

CROSS-REFERENCE TO RELATED APPLICATIONS

This application is a continuation of U.S. non-provisional application Ser. No. 16/663,685, filed Oct. 25, 2019, which claims priority from U.S. provisional application No. 62/805,745, filed Feb. 14, 2019, each of which is hereby incorporated by reference in its entirety.

TECHNICAL FIELD/FIELD OF THE DISCLOSURE

The present disclosure relates generally to valve equipment and specifically to visual indicators for valve positions.

BACKGROUND OF THE DISCLOSURE

Valves may be used to control the flow of fluids. Valves may be manually or automatically actuated such as by hydraulic or pneumatic actuators. However, the position of the valve, i.e. whether the valve is open or closed, may not be immediately recognizable by visual inspection due to the configuration of certain valves or distance separating personnel and the valve.

SUMMARY

The present disclosure provides for a valve. The valve may include a valve housing having a central bore. The valve may include a gate positioned within the valve housing, the gate movable from an open position and a closed position. The valve may include a tail stem coupled to the gate and extending from the valve housing. The tail stem may be movable from a retracted position to an extended position. The valve may include a tail stem protector coupled to and extending from the valve housing. The tail stem protector may be generally tubular and may be positioned about the tail stem. The tail stem protector may have a slot formed therein that extends longitudinally along the tail stem protector. The valve may include a valve position indicator. The valve position indicator may include a spline barrel. The spline barrel may be generally tubular and may be positioned about the tail stem protector. The spline barrel may have a helical slot formed therein. The spline barrel may be rotatably coupled to the tail stem protector. The valve position indicator may include an indicator flag coupled to the spline barrel and extending radially therefrom. The valve position indicator may include a follower coupled to the tail stem and extending in a direction perpendicular to the extent of the tail stem. The follower may extend through the slot in the tail stem protector and the helical slot of the spline barrel The present disclosure also provides for a valve position indicator for a valve. The valve position indicator may include a spline barrel. The spline barrel may be generally tubular and may be positionable about a tail stem protector of the valve. The spline barrel may have a helical slot formed therein. The spline barrel may be rotatably coupled to the tail stem protector. The valve position indicator may include an indicator flag coupled to the spline barrel and may extend radially therefrom. The valve position indicator may include a follower coupleable to a tail stem of the valve. The follower may extend in a direction perpendicular to the extent of the tail stem. The follower may extend through a slot in the tail stem protector and the helical slot of the spline barrel when the spline barrel is positioned about the tail stem protector.

The present disclosure also provides for a method. The method may include providing a valve. The valve may include a valve housing having a central bore. The valve may include a gate positioned within the valve housing, the gate movable from an open position and a closed position. The valve may include a tail stem coupled to the gate and extending from the valve housing. The tail stem may be movable from a retracted position to an extended position. The valve may include a tail stem protector coupled to and extending from the valve housing. The tail stem protector may be generally tubular and may be positioned about the tail stem. The tail stem protector may have a slot formed therein that extends longitudinally along the tail stem protector. The method may include coupling a valve position indicator to the valve. The valve position indicator may include a spline barrel, the spline barrel being generally tubular and positioned about the tail stem protector. The spline barrel may have a helical slot formed therein. The spline barrel may be rotatably coupled to the tail stem protector. The valve position indicator may include an indicator flag coupled to the spline barrel and extending radially therefrom. The valve position indicator may include a follower coupled to the tail stem. The follower may extend in a direction perpendicular to the extent of the tail stem. The follower may extend through the slot in the tail stem protector and the helical slot of the spline barrel. The method may include moving the tail stem from the retracted to the extended position and rotating, with the follower, the spline barrel between a first position and a second position. The method may include moving the indicator flag from a first position to a second position.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
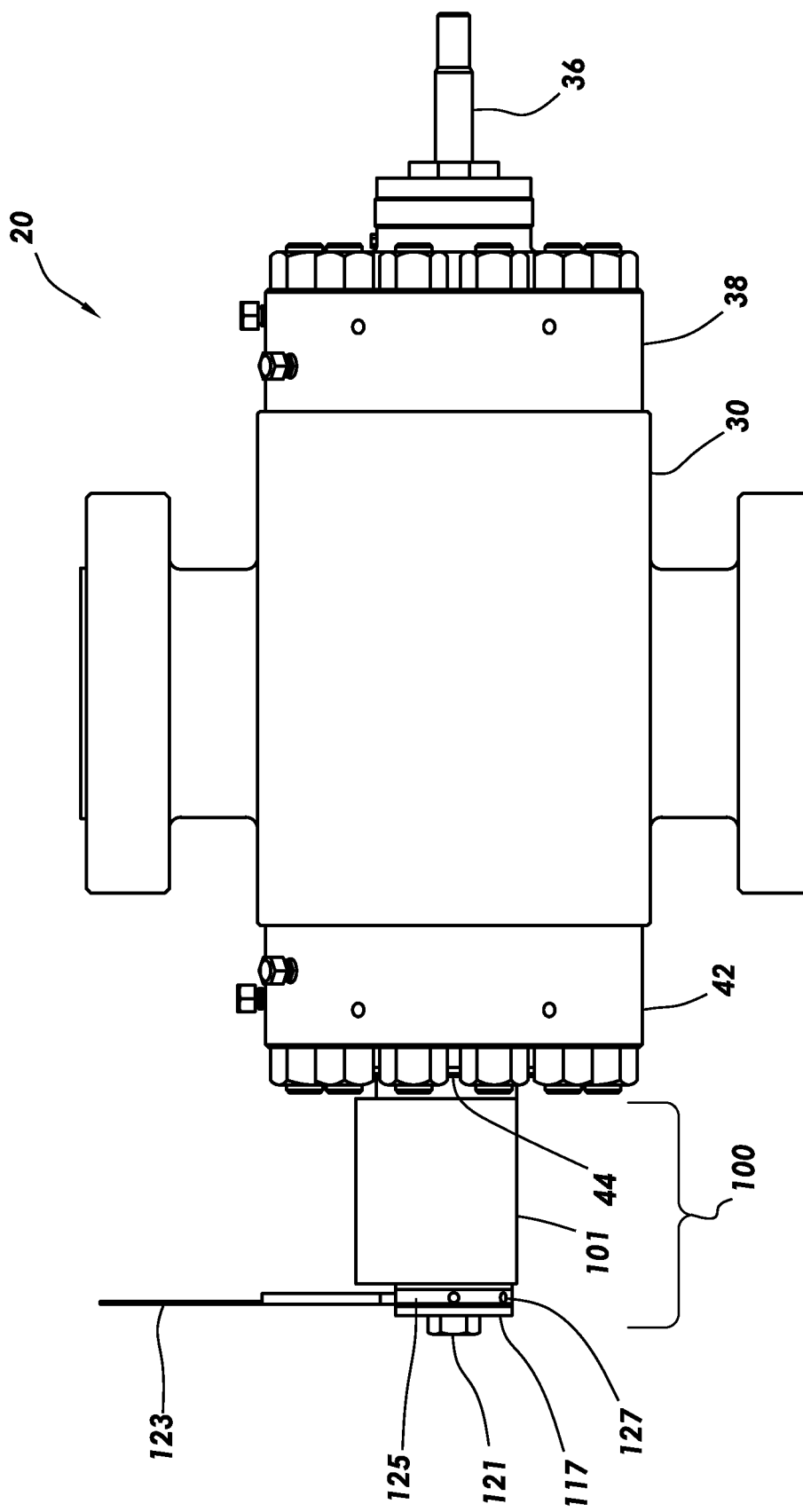
FIG. 1 depicts a valve having a valve position indicator consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts valve 20 consistent with at least one embodiment of the present disclosure. In some embodiments, valve 20 may be a gate valve. In some embodiments, valve position indicator 100 may, for example and without limitation, visually indicate the status of the valve 20 to which valve position indicator 100 is coupled, i.e. whether valve 20 is in an open position or a closed position; may visually indicate that valve 20 is in an intermediate position between fully open and fully closed; or may visually indicate that valve 20 is moving between the open and the closed positions, as further described below.

Figure 2:
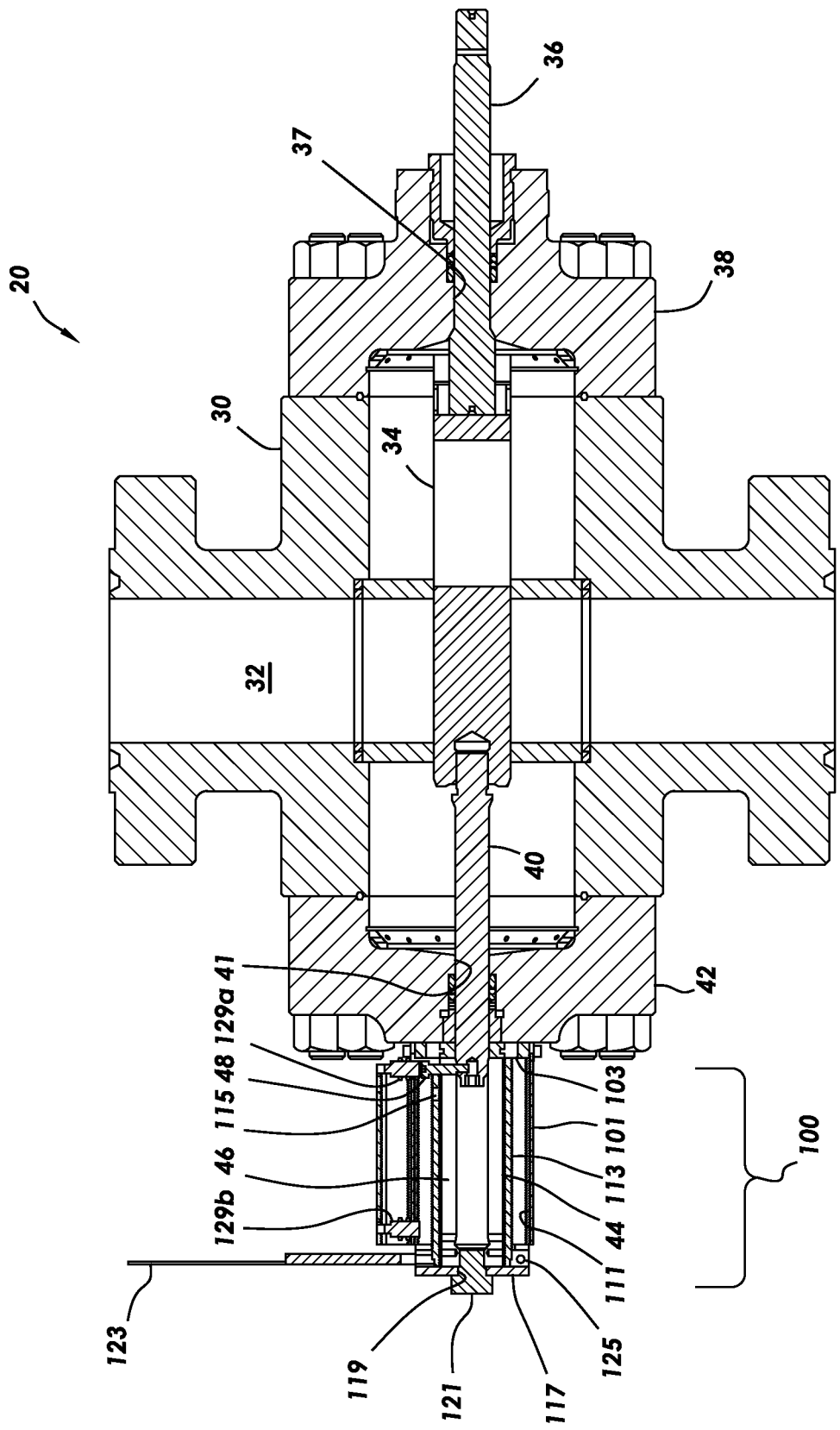
FIG. 2 depicts a cross-section view of the valve of FIG. 1.
Figure 3:
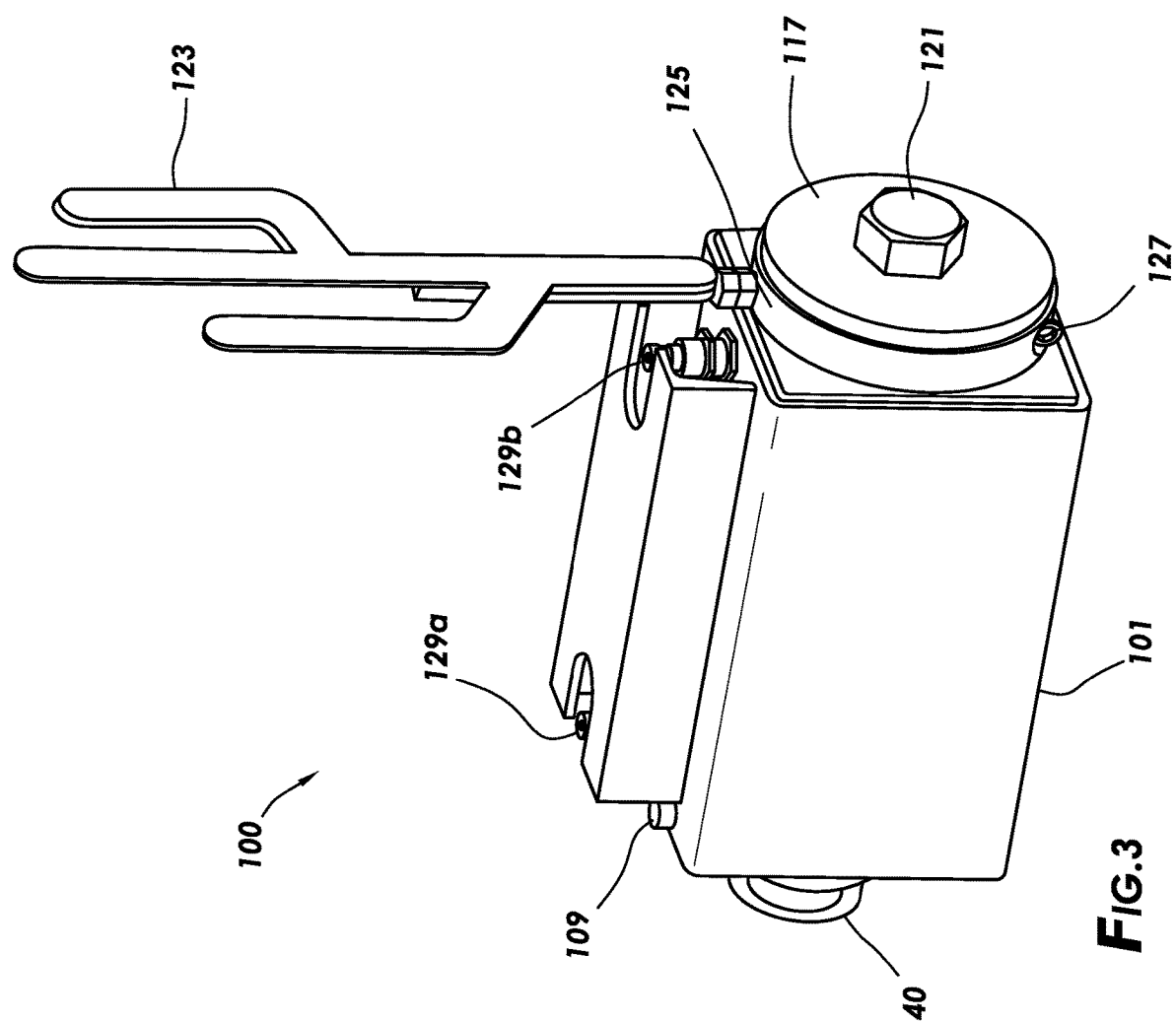
FIG. 3 depicts a perspective view of a valve position indicator consistent with at least one embodiment of the present disclosure.
Figure 4:
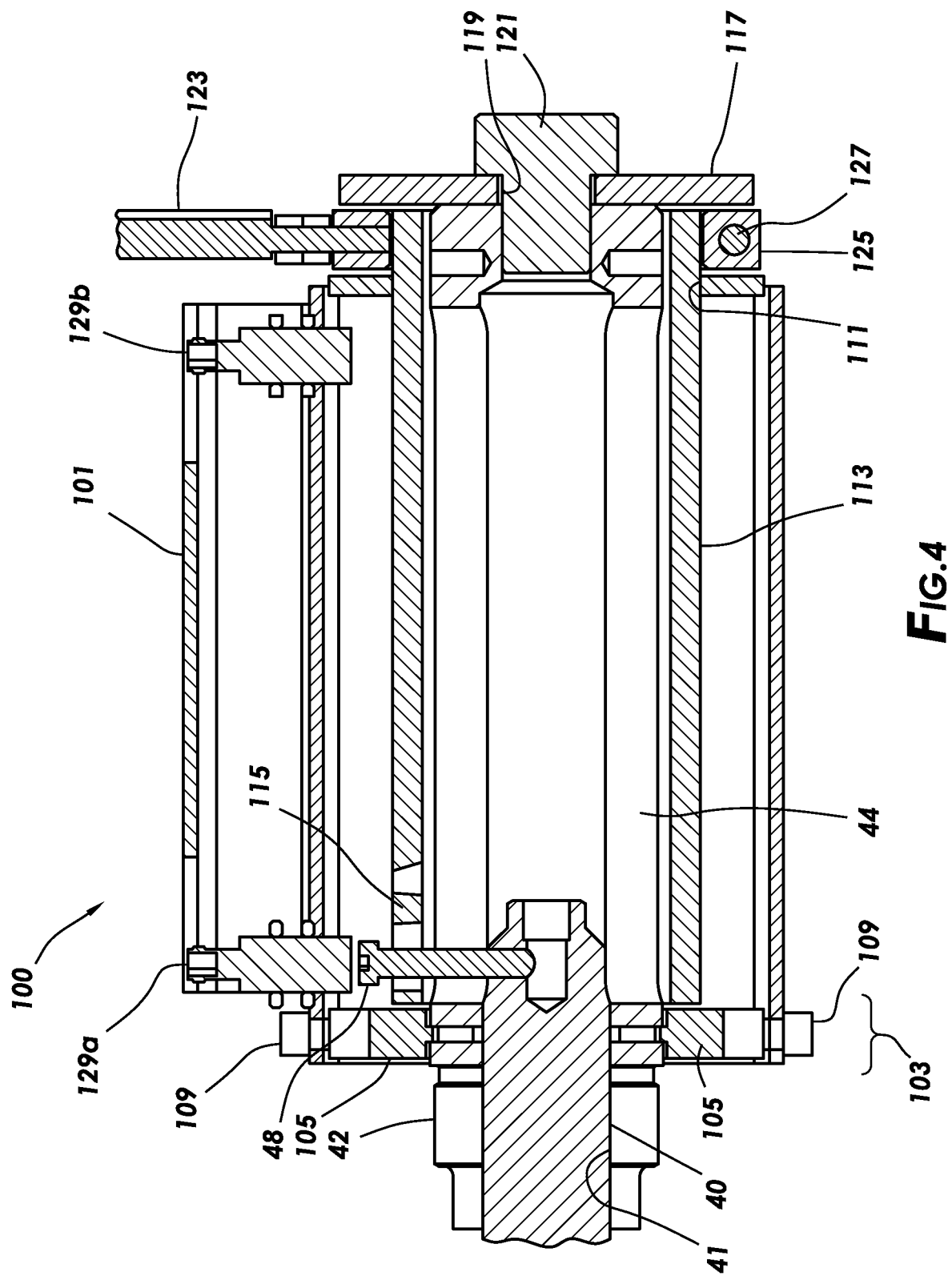
FIG. 4 depicts a cross-section of the valve position indicator of FIG. 3.
Figure 5:
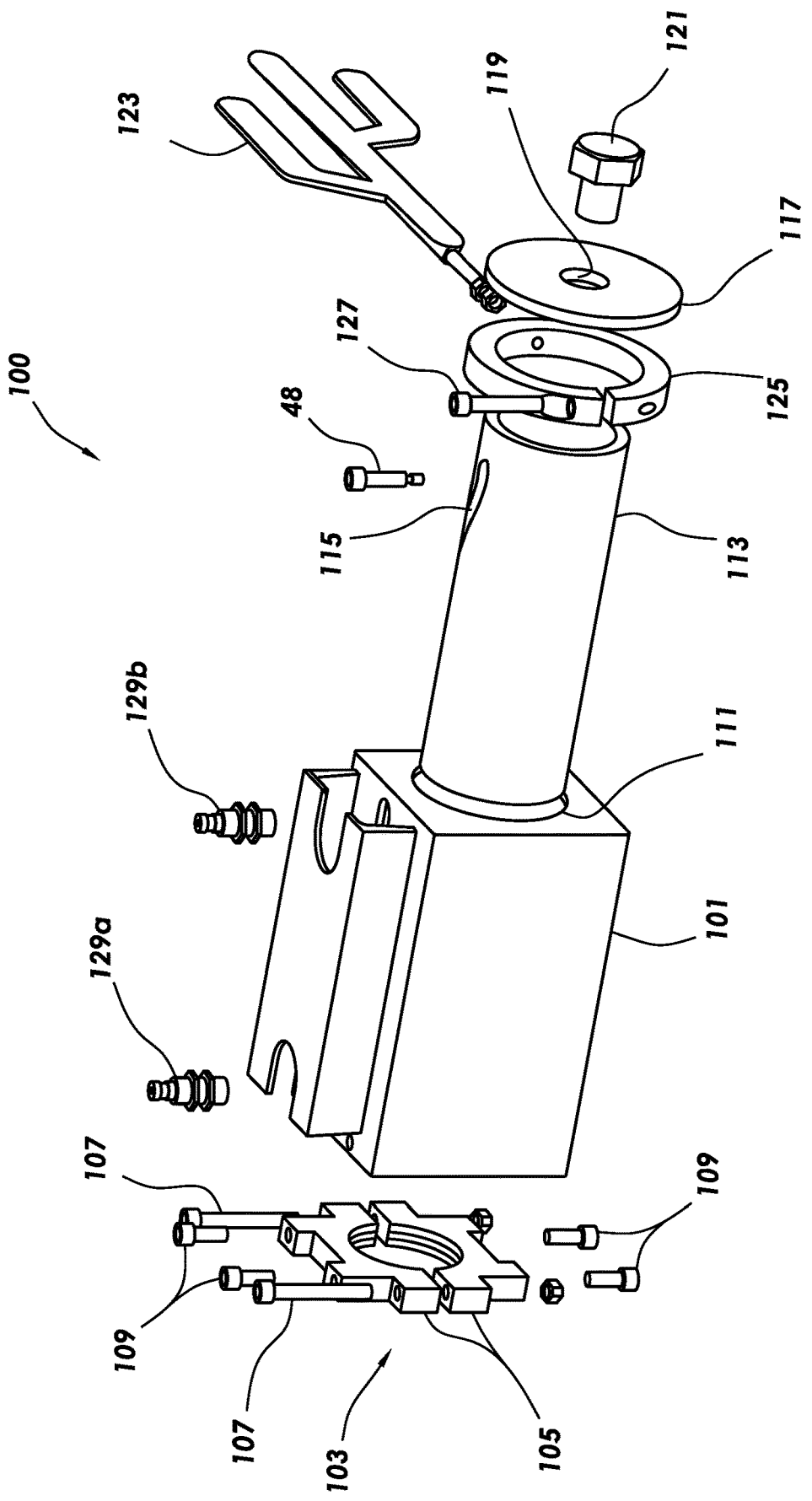
FIG. 5 depicts a partially transparent exploded view of the valve position indicator of FIG. 3.

FIG. 2 depicts a cross-section of valve 20 having valve position indicator 100 coupled thereto. Valve 20 may include valve housing 30. Valve housing 30 may include central bore 32 that can be selectively opened or closed by valve 20. In some embodiments, valve 20 may be a gate valve, but one of ordinary skill in the art with the benefit of this disclosure will understand that other types of valve may be used with valve position indicator 100 without deviating from the scope of this disclosure. In some such embodiments, valve 20 may include gate 34 positioned within valve housing 30, which is adapted to move between a position in which central bore 32 is open to fluid communication through central bore 32 and a closed position, as depicted in FIG. 2, in which central bore 32 is closed to fluid communication therethrough. In some embodiments, gate 34 may be moved between the open position and the closed position by stem 36. Stem 36 may extend through hole 37 formed in bonnet 38, which is mechanically coupled to and sealed to valve housing 30 such that stem 36 may move along the longitudinal axis of stem 36 through hole 37. In some embodiments, stem 36 may be at least partially threaded or may be otherwise coupled to a threaded rod such that stem 36 may be moved by turning a crank or handwheel. In some embodiments, stem 36 may be moved using an actuator such as a hydraulic or pneumatic actuator.

In some embodiments, gate 34 may be supported on the end opposite stem 36 by tail stem 40. Tail stem 40 may extend through hole 41 formed in tail bonnet 42, which is mechanically coupled to and sealed to valve housing 30 such that tail stem 40 may move along the longitudinal axis of stem 36 and tail stem 40 through hole 41 as stem 36 is moved to reposition gate 34. In some embodiments, when gate 34 is in the open position, tail stem 40 may extend from tail bonnet 42 a larger distance, defining an extended position of tail stem 40, than when gate 34 is in the closed position, defining a retracted position of tail stem 40.

In some embodiments, tail stem 40 may be positioned within tail stem protector 44 to, for example and without limitation, avoid damage to tail stem 40 when tail stem 40 is extended from tail bonnet 42. Tail stem 40 may be generally tubular and may be mechanically coupled to tail bonnet 42 about hole 41. In some embodiments, tail stem protector 44 may include slot 46 extending longitudinally along tail stem protector 44. In some embodiments, follower 48 may be coupled to tail stem 40. Follower 48 may be a protrusion or other body coupled to tail stem 40 such that follower 48 extends in a direction perpendicular to the extent of tail stem 40. Follower 48 may extend at least partially through slot 46 of tail stem protector 44. In some embodiments, follower 48 may be a threaded fastener such as a bolt or shoulder bolt or may be a pin or any other fastener or body coupled to tail stem 40 that extends perpendicular to the extent of tail stem 40.

In some embodiments, valve position indicator 100 may mechanically couple to tail stem protector 44 of valve 20. Valve position indicator 100, as shown in FIGS. 2-5, may include outer housing 101. Outer housing 101 may be an elongated tube or box-shaped body that, when installed to tail stem protector 44, may extend along the outside of tail stem protector 44. Outer housing 101 may mechanically couple to tail stem protector 44 using clamp 103. Clamp 103 may include one or more clamp jaws 105, which may be connected together about tail stem protector 44 using one or more threaded fasteners, such as bolts 107. Clamp 103 may subsequently be coupled to outer housing 101 using one or more threaded fasteners such as bolts 109.

In some embodiments, outer housing 101 may include opening 111 at the end of outer housing 101 opposite clamp 103. In some embodiments, opening 111 may be positioned generally aligned with the end of tail stem protector 44.

In some embodiments, valve position indicator 100 may include spline barrel 113. Spline barrel 113 may be generally tubular and may be positioned within outer housing 101 outside of tail stem protector 44. Spline barrel 113 may include helical slot 115. Helical slot 115 may extend from near the first end of spline barrel 113 to near the second end of spline barrel 113. Helical slot 115 may be formed to have a pitch such that the first end of helical slot 115 is offset by a selected angle from the second end of helical slot 115. In some such embodiments, for example and without limitation, the first end of helical slot 115 may be rotationally offset from the second end of helical slot 115 by approximately 90° or any other angle as desired.

In some embodiments, spline barrel 113 may be retained to tail stem protector 44 such that spline barrel 113 may rotate relative to tail stem protector 44. In some embodiments, valve position indicator 100 may include sleeve retainer 117 to retain spline barrel 113. In some embodiments, sleeve retainer 117 may be a plate having a diameter or width larger than the diameter of spline barrel 113. In some embodiments, sleeve retainer 117 may have retainer hole 119 positioned to allow retaining connector 121 to pass therethrough and secure sleeve retainer 117 to tail stem protector 44. Retaining connector 121 may be, for example and without limitation, a threaded fastener such as a bolt. In such embodiments, spline barrel 113 may be retained between sleeve retainer 117 and one or more components of outer housing 101, such as clamp 103, such that longitudinal movement of spline barrel 113 relative to tail stem protector 44 is constrained.

In some embodiments, vale position indicator 100 may include indicator flag 123. Indicator flag 123 may be mechanically coupled to spline barrel 113. In some embodiments, indicator flag 123 may extend radially from spline barrel 113. In some embodiments, indicator flag 123 may be coupled to spline barrel 113 by flag clamp 125. Flag clamp 125 may, in some embodiments, be a ring clamp secured to spline barrel 113 by tightening a threaded fastener, depicted as bolt 127. In some embodiments, flag clamp 125 may allow indicator flag 123 to be coupled to spline barrel 113 at any rotational orientation such that the alignment of indicator flag 123 relative to spline barrel 113 may be adjusted as further described below.

Figure 6:
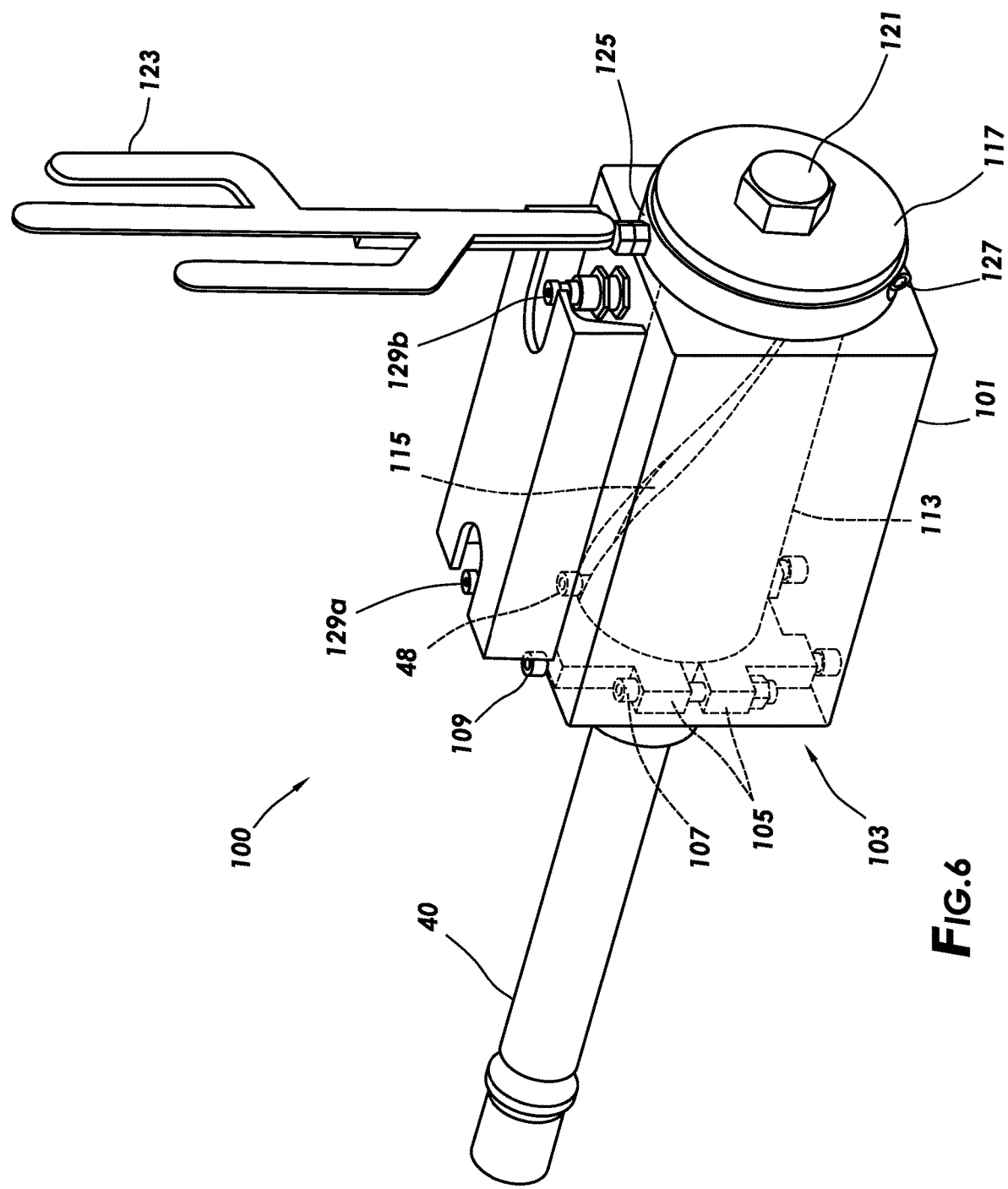
FIG. 6 depicts a partially transparent perspective view of the valve position indicator of FIG. 3 in a first position.
Figure 7:
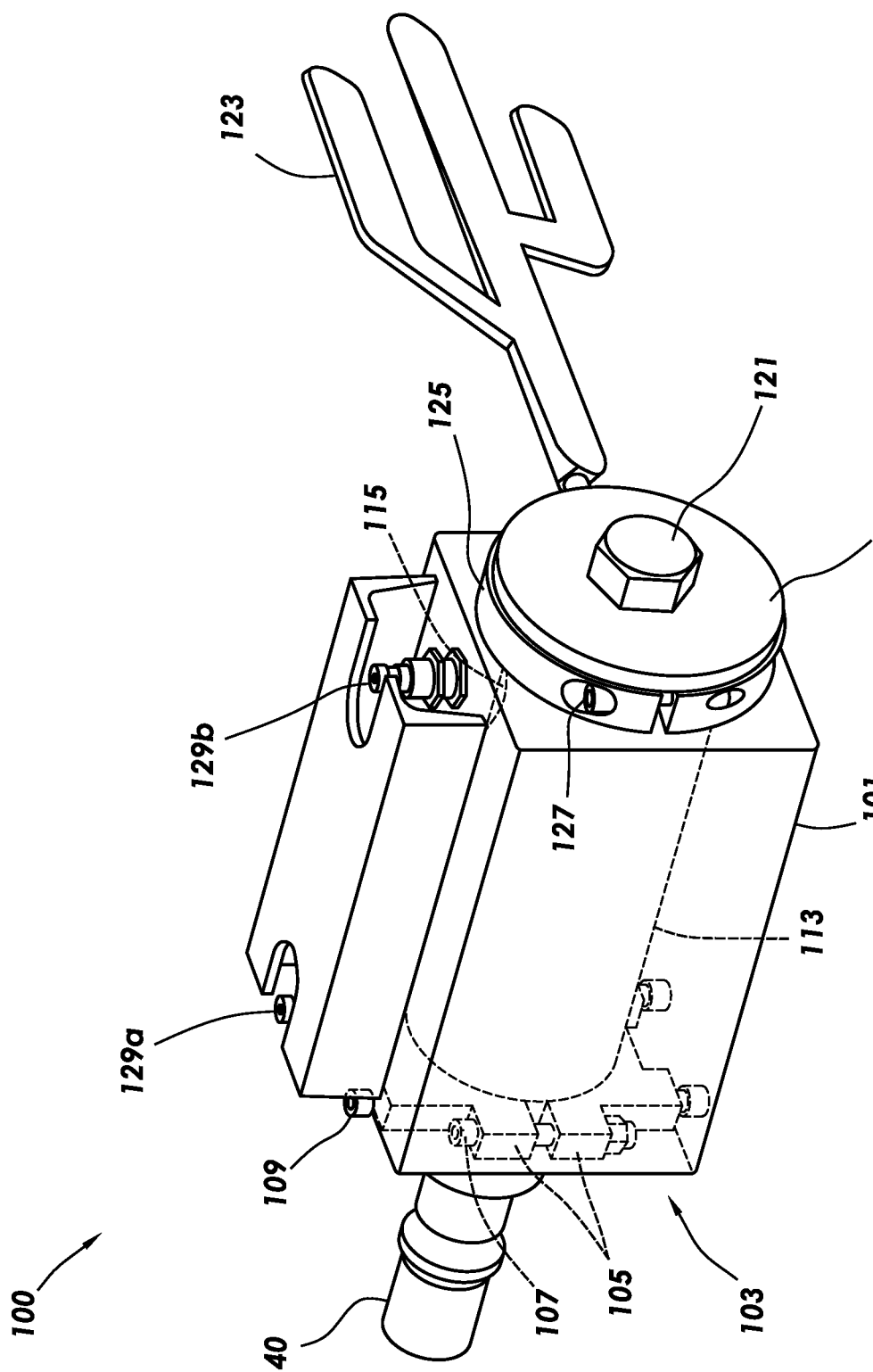
FIG. 7 depicts a partially transparent perspective view of the valve position indicator of FIG. 3 in a second position.

When valve position indicator 100 is assembled to valve 20, follower 48 may be positioned at least partially within or may extend through helical slot 115. As tail stem 40 moves between the extended and retracted position, follower 48 may traverse helical slot 115, causing spline barrel 113 to rotate relative to tail stem protector 44 commensurate with the pitch of helical slot 115. As spline barrel 113 rotates, indicator flag 123 may be moved in rotational orientation as indicator flag 123 is coupled to spline barrel 113. Indicator flag 123 may be defined as being in a first position when tail stem 40 is in the retracted position as shown in FIG. 6 and may be defined as being in a second position when tail stem 40 is in the extended position as shown in FIG. 7. The first and second positions of indicator flag 123 may be rotationally offset by the same rotational offset defined between the first end of helical slot 115 and the second end of helical slot 115.

In some embodiments, for example and without limitation, where the rotational offset is approximately 90°, indicator flag 123 may be positioned substantially vertically when in the first position and may be positioned substantially horizontally when in the second position. In other embodiments, indicator flag 123 may be positioned substantially horizontally when in the first position and may be positioned substantially vertically when in the second position. Such orientations may be selected by realigning indicator flag 123 relative to spline barrel 113 using flag clamp 125.

By preselecting the orientations of indicator flag 123 when in the first position and in the second position, the status of valve 20 may be readily identified by visual inspection of indicator flag 123. For example, where the retracted position of tail stem 40 corresponds to a state in which valve 20 is closed, the first position of indicator flag 123, as depicted in FIG. 6, may indicate to an observer that valve 20 is fully closed. Likewise, where the extended position of tail stem 40 corresponds to a state in which valve 20 is open, the second position of indicator flag 123, as depicted in FIG. 7, may indicate to an observer that valve 20 is fully open. If indicator flag 123 is in any position other than the first position or second position, indicator flag 123 may thereby indicate that valve 20 is not fully open or closed. Likewise, rotational movement of indicator flag 123 may indicate to an observer that valve 20 is being manipulated. The direction of movement of indicator flag 123 may indicate to the observer whether valve 20 is in the process of being opened or is in the process of being closed.

In some embodiments, indicator flag 123 may have a contrasting or otherwise highly visible color or shape to assist with the identification of the orientation of indicator flag 123. The specific shape of indicator flag 123 depicted herein is not intended to limit the scope of the present disclosure, and indicator flag 123 may be formed in any shape or configuration or may be colored or patterned in any way within the scope of this disclosure.

In some embodiments, valve position indicator 100 may include one or more sensors positioned to determine the position of tail stem 40, and thereby determine the status of valve 20. For example, in some embodiments, valve position indicator 100 may include one or more proximity sensors 129a, 129b. Proximity sensors 129a, 129b may be any sensor capable of detecting that follower 48 is in a position proximate proximity sensor 129a, 129b, and may be, for example and without limitation, one or more of a capacitive sensor, ultrasonic sensor, eddy current sensor, inductive sensor, magnetic sensor, reed switch, optical sensor, Hall effect sensor, or a physical sensor such as a limit switch. In some embodiments, proximity sensors 129a, 129b may be coupled to outer housing 101 such that proximity sensors 129a, 129b are positioned near to follower 48 when follower 48 is in a preselected position. For example and without limitation, in some embodiments, proximity sensor 129a may be positioned proximate to follower 48 when tail stem 40 is in the retracted position as depicted in FIG. 6. Proximity sensor 129a may provide a signal reflecting that follower 48 is proximate proximity sensor 129a, thereby indicating that tail stem 40 is in the retracted position and valve 20 is closed. Likewise, in some embodiments, proximity sensor 129b may be positioned proximate to follower 48 when tail stem 40 is in the extended position as depicted in FIG. 7. Proximity sensor 129b may provide a signal reflecting that follower 48 is proximate proximity sensor 129b, thereby indicating that tail stem 40 is in the extended position and valve 20 is open. In some embodiments, additional proximity sensors may be used to detect other desired positions of tail stem 40 relative to outer housing 101. In some embodiments, when neither of proximity sensors 129a, 129b detect follower 48, such a state may indicate that valve 20 is not fully open or fully closed.

Figure 8:
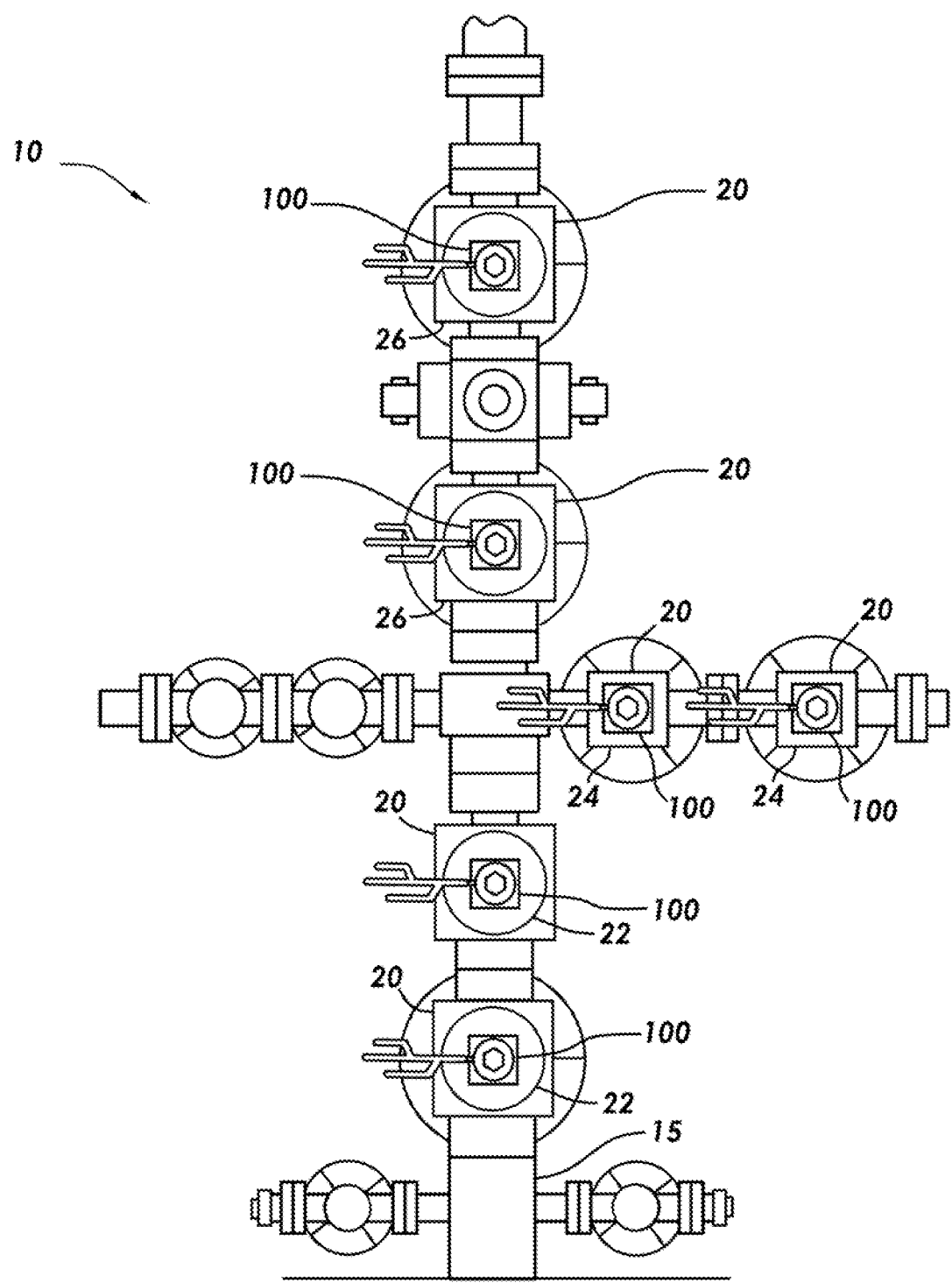
FIG. 8 depicts a valve tree having valve position indicators consistent with at least one embodiment of the present disclosure.

In some embodiments, valve 20 may be used as part of a flow control apparatus for a well such as valve tree 10 as depicted in FIG. 8. Valve tree 10 may be coupled to wellhead 15 and may include one or more valves 20 for controlling fluid connections including, for example and without limitation, master valves 22, wing valves 24, and swab valves 26. In some embodiments, one or more of valves 20 of valve tree 10 may include valve position indicator 100.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A valve position indicator for a valve, the valve position indicator comprising:
    a spline barrel, the spline barrel being generally tubular and positionable about a tail stem protector of the valve such that the tail stem protector is at least partially within an interior of the spline barrel, the spline barrel having a helical slot formed therein, the spline barrel rotatably coupled to the tail stem protector;
    an indicator flag, the indicator flag coupled to the spline barrel and extending radially therefrom; and
    a follower, the follower coupleable to a tail stem of the valve, the follower extending in a direction perpendicular to the extent of the tail stem, the follower extending through a slot in the tail stem protector and the helical slot of the spline barrel when the spline barrel is positioned about the tail stem protector.

2. The valve position indicator of claim 1, further comprising a sleeve retainer, the sleeve retainer coupled to the tail stem protector, the sleeve retainer having a diameter or width larger than the spline barrel, the sleeve retainer constraining longitudinal motion of the spline barrel relative to the tail stem protector.

3. The valve position indicator of claim 2, wherein the sleeve retainer is coupled to an end of the tail stem protector by a threaded fastener.

4. The valve position indicator of claim 1, wherein the indicator flag is coupled to the spline barrel by a flag clamp, the flag clamp being a ring clamp, the indicator flag adjustable in rotational orientation by the flag clamp.

5. The valve position indicator of claim 1, further comprising an outer housing, the outer housing coupled to the tail stem protector, the outer housing positioned outside of the spline barrel.

6. The valve position indicator of claim 5, wherein the outer housing is coupled to the tail stem protector by a clamp having one or more clamp jaws.

7. The valve position indicator of claim 5, further comprising a proximity sensor, the proximity sensor coupled to the outer housing, the proximity sensor positioned to detect the position of the follower relative to the tail stem protector.

8. The valve position indicator of claim 7, wherein the proximity sensor comprises a capacitive sensor, ultrasonic sensor, eddy current sensor, inductive sensor, magnetic sensor, reed switch, optical sensor, Hall effect sensor, physical sensor, or limit switch.

9. The valve position indicator of claim 1, wherein the helical slot of the spline barrel is formed to have a pitch such that a first end of the helical slot is offset by a selected angle from a second end of the helical slot such that the spline barrel is rotated between a first and second position as the tail stem is moved between extended and retracted positions.

10. The valve position indicator of claim 9, wherein the selected angle is 90°.

* * * * *